United States Patent
Mccoog et al.

(10) Patent No.: US 8,739,248 B2
(45) Date of Patent: May 27, 2014

(54) WIRELESS ACCESS TO DEVICE FUNCTIONS

(75) Inventors: Phillip A. Mccoog, Portland, OR (US); Sandi L. Schneider, Sweet, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 137 days.

(21) Appl. No.: 13/405,788

(22) Filed: Feb. 27, 2012

(65) Prior Publication Data

US 2013/0227643 A1 Aug. 29, 2013

(51) Int. Cl.
*H04L 29/00* (2006.01)
(52) U.S. Cl.
USPC .......................................................... 726/3
(58) Field of Classification Search
USPC ....................................................... 709/22
See application file for complete search history.

(56) References Cited

U.S. PATENT DOCUMENTS

2012/0127925 A1* 5/2012 Kim et al. ...................... 370/328
2013/0086665 A1* 4/2013 Filippi et al. ...................... 726/7

OTHER PUBLICATIONS

Federal: Lexmark CAC Authentication; Retrieved on Feb. 27, 2012 from http://www1.lexmark.com/en_US/solutions/industry-solutions/federal/SO-Federal-CAC.pdf, 4 pages.

* cited by examiner

*Primary Examiner* — Ghazal Shehni
(74) *Attorney, Agent, or Firm* — Nathan R. Rieth (57) ABSTRACT

In an embodiment, a method includes permitting a wireless client to wirelessly access an internal network of a Wi-Fi capable device. The method also includes presenting a reduced set of device functions to the client when the device operates in an open mode, and presenting an increased set of device functions to the client when the device operates in a secure mode.

13 Claims, 4 Drawing Sheets

WIRELESS ACCESS TO DEVICE FUNCTIONS

BACKGROUND

The proliferation of mobile computing devices such as smart phones, PDAs, tablet PCs, etc., invites the use of peer-to-peer Wi-Fi networks that help make Wi-Fi capable host devices readily accessible and easy to use. The ease of use enabled by such wireless accessibility, however, can present security related challenges. For example, in a Wi-Fi capable multi-function printing device, allowing a wireless client to access a print function may not be a security risk. However, allowing a wireless client to access other functions such as scanning images from the glass, inserting workflow items, redirecting print jobs, reconfiguring the printer and so on, may present more significant security risks. In general, users of Wi-Fi enabled mobile computing devices want the same ease-of-use experience when wirelessly accessing a host device as they get when accessing the same host device using a wired connection.

BRIEF DESCRIPTION OF THE DRAWINGS

The present embodiments will now be described, by way of example, with reference to the accompanying drawings, in which.

DETAILED DESCRIPTION

Overview

As generally noted above, the proliferation of wireless computing devices that use peer-to-peer type Wi-Fi connections for easy access to Wi-Fi host devices can introduce security risks that might not otherwise exist when clients access such host devices through physical connections such as a cable. There is a measure of security inherent when physically connecting a client device to a host device. However, that security is typically not present when a Wi-Fi client wirelessly connects to a host device.

It is generally expected that many new classes of smaller devices will eventually include Wi-Fi connectability, in addition to USB and other connectability. Such devices include, for example, printers, multi-function printers, televisions, set-top boxes, cameras, DVD players, stereo systems, media storage devices (e.g., music storage devices, photo and video storage devices), and the like. While wireless client devices typically make connections to conventional Wi-Fi networks through hardware devices known as wireless access points, smaller host devices with Wi-Fi capability are increasingly implementing software access points that allow wireless client devices to easily access host device functionality. For example, a wireless device (i.e., a "client") coming within range of a Wi-Fi capable media storage device (i.e., the "host") may wirelessly access the storage device through the host's software access point in order to play media files (e.g., music or video files) stored on the host device. The integration of software access points in such host devices obviates the need for connecting host devices to hardware access point devices. Wi-Fi Direct is a recent standard developed to regulate the integration and implementation of such software access points in Wi-Fi capable devices.

While fully exposing a host device's capability to wireless clients has obvious benefits (e.g., the efficient use by numerous clients of the host device's services and functions), such exposure can also present security risks. For example, the owner of a Wi-Fi capable media storage device may intend that wireless media players within range of the storage device can access and play media files stored on the device (e.g., music or video files). However, the owner may not intend that such wireless media players have the ability to delete, add to, rename or otherwise organize the media files on the storage device. In another example, in a given setting it may be acceptable for any wireless client device to wirelessly access a Wi-Fi capable multi-function printer for the purpose of using a print function. However, in the same setting it may be a security risk for such wireless clients to access the printer for the purpose of scanning images from the glass, inserting workflow items, redirecting print jobs, reconfiguring the printer and so on.

Embodiments of the present disclosure help to reduce the risks associated with providing wireless access to Wi-Fi capable host devices. In general, a network filter operating on the internal network of the host device presents varying levels of device functionality over the network to wireless clients depending on the level of security with which the wireless clients access the host device network. In one implementation, the host device and/or network operates in different modes simultaneously. Here, the host device network filter operates in an "open mode" for wireless clients accessing the host device without any security key, while simultaneously operating in one or more "secure modes" for wireless clients accessing the host device using one or more corresponding security keys. In this implementation, access to the host device network is not regulated, and wireless clients are not denied access to the network. Instead, the available functionality that a wireless client sees via the host device network is filtered in a manner that depends on the level of security the wireless client uses to access the host device network. Thus, a first wireless client that accesses the device network in an open mode will be presented with a first set of functions available from the host device, and a second wireless client that accesses the device network in a secure mode will be presented with a second set of functions available from the host device.

In another implementation, the host device is set to operate in one mode at a time. Here, the host device network filter presents one set of functions to wireless clients accessing the host device network. The set of functions made available to the wireless clients depends on the mode setting of the host device. Wireless clients providing the appropriate security key are able to access the host device network and make use of whatever set of host device functions are presented by the network filter. Wireless clients unable to provide the appropriate security key are unable to access the host device network. When the mode of operation of the host device is changed, the host device network filter presents a different set of functions to wireless clients accessing the host device network. Thus, the host device may initially be set to operate in an "open mode". In an open mode, all wireless clients are allowed to access the host device network without a security key and make use of the set of host device functions presented by the network filter in the open mode. The host device may subsequently be set to operate in a secure mode, which allows wireless clients having an appropriate security key to access the host device network and make use of the set of host device functions presented by the network filter in the secure mode. Functions presented in the open mode are typically a more limited set of functions while functions presented in the secure mode are typically a more expanded set of functions.

In one example embodiment, a processor-readable medium stores code representing executable instructions. When executed by a processor, the instructions cause the processor to implement a network on a Wi-Fi capable device, and permit a wireless client to wirelessly access the network. The processor then presents a different set of device functions to the wireless client based on the level of security with which the wireless client accesses the network.

In another example embodiment, a method includes permitting a wireless client to wirelessly access an internal network of a Wi-Fi capable device. A reduced set of device functions is presented to the client when the device operates in an open mode, and an increased set of device functions is presented to the client when the device operates in a secure mode.

In yet another example embodiment, a Wi-Fi capable device includes a plurality of device functions. The device also includes an internal network that is wirelessly accessible by wireless clients. The device also has a network function filter to present filtered sets of the device functions to the wireless clients over the internal network based on a security mode of the device.

Illustrative Embodiments

Figure 1:
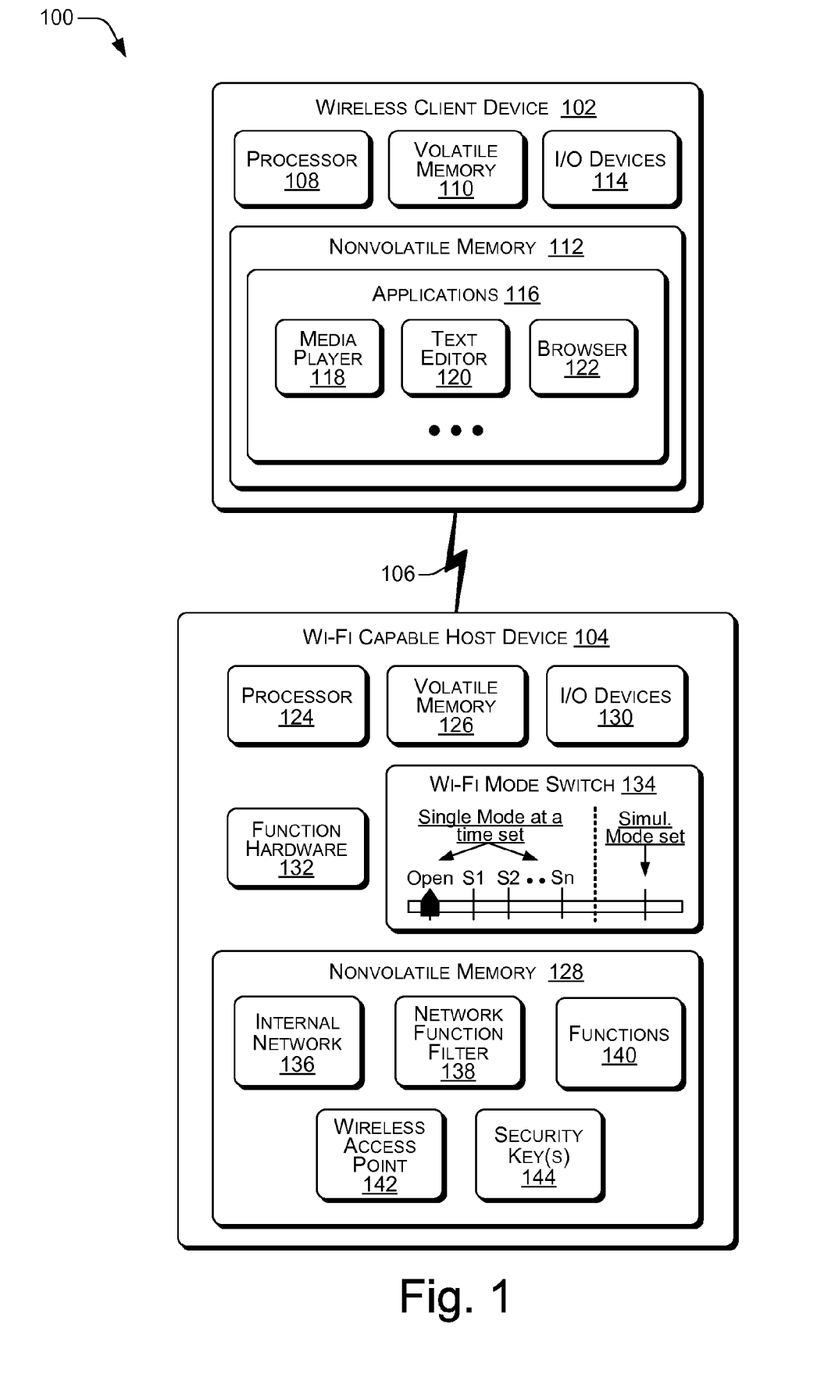
FIG. 1 shows an exemplary environment suitable for wirelessly accessing device functions as disclosed herein, according to an embodiment.

FIG. 1 shows an exemplary environment 100 suitable for wirelessly accessing device functions as disclosed herein, according to an embodiment of the disclosure. The environment 100 includes a wireless client device 102 and a Wi-Fi capable host device 104 coupled through a wireless connection 106. The general designation herein of wireless client device 102 as a "client" device and Wi-Fi capable host device 104 as a "host" device is merely due to the typical nature of transactions that take place between the two devices. That is, Wi-Fi capable host device 104 hosts various functions and/or services that are made available to a wireless client device 102 through wireless connection 106, enabled when wireless client 102 comes within range of host device 104.

Wireless client device 102 is intended to represent any of a variety of typically mobile computing devices capable of wireless communication between Wi-Fi capable devices. Wireless client devices 102 typically include mobile computing devices such as, for example, cell phones, smart phones, personal digital assistants (PDAs), tablet PCs, and other handheld PCs or portable computers. However, wireless client devices 102 may also include other types of computing devices that are not generally considered to be mobile devices, such as, for example, desktop PCs and workstations.

A wireless client device 102 generally includes a processor (CPU) 108, a volatile memory 110 (i.e., RAM), and a nonvolatile memory 112 (e.g., ROM, hard disk, floppy disk, CD-ROM, etc.). Client device 102 also typically includes various input/output devices 114 such as a keyboard, a touch screen, a speaker, a mouse, a monitor, and so on. Nonvolatile memory 112 and volatile memory 110 are processor-readable media that generally provide storage for code representing computer/processor-readable instructions, data structures, program modules and other data for client device 102.

Wireless client device 102 may implement various application programs 116, such as a media player 118, a text editor 120, a web browser 122, other applications, and/or other instructions stored in memory 112 and/or volatile memory 110 that are executable on processor 108 to enable transactions with a Wi-Fi capable host device 104 over a wireless connection 106. Such transactions generally include the transfer, manipulation, and/or other preparation of data in electronic form by and between wireless client device 102 and a Wi-Fi capable device 104 for purposes related to various functions and or services made available by and implemented on the Wi-Fi capable host device 104.

Wi-Fi capable host device 104 is intended to represent any of a wide variety of focused-purpose type devices that are wirelessly accessible. A focused-purpose device is a device that implements functions and/or services that are related to a particular purpose. Examples of such Wi-Fi capable host devices 104 include, but are not limited to, printers, multifunction printers, scanners, copiers, televisions, set-top boxes, cameras, DVD players, stereo systems, media storage devices (e.g., music storage devices, photo and video storage devices), and the like.

A Wi-Fi capable host device 104 generally includes a processor (CPU) 124, a volatile memory 126, a nonvolatile memory 128, input/output devices 130 such as a keypad and a touch screen, and function-related hardware 132. In a first example implementation, the host device 104 includes a Wi-Fi mode switch 134 that enables a user to set the host device 104 to operate in one of several security modes with respect to wirelessly connected client devices 102. In this implementation the host device 104 operates in a "single mode at a time" setting, as determined by the mode switch 134. The security modes include an "open mode" and at least one "secure mode". Therefore, there may be more than one secure mode (e.g., S1-Sn), and the available operating modes for host device 104 might include, for example, the "open mode" (Open), a "secure mode 1" (S1), and a "secure mode 2" (S2). In a second example implementation, as discussed below, the host device 104 operates in a simultaneous mode, which includes operation in two or more security modes simultaneously. In this implementation, the host device 104 may not include a Wi-Fi mode switch 134 at all, or, alternatively, the Wi-Fi mode switch 134 may have a selectable setting for a "simultaneous mode" (Simul. Mode).

Nonvolatile memory 128 stores code modules having processor-executable code, that when executed enable various features on the host device 104. For example, memory 128 includes modules for an internal network 136, a network function filter 138, and host device functions 140. The internal network 136 generally enables client devices, connected in both a wired and wireless manner, to access and make use of functions 140 operable on the host device 104. For example, a wired client device (not shown) physically plugged into the host device 104 through a USB port (not shown) is able to access functions 140 over the internal network 136. Likewise, a wireless client device 102 wirelessly connected to the host device 104 is able to access functions 140 over internal network 136, as discussed in greater detail below. Memory 128 also includes a software-based wireless access point 142 that, when executed, allows wireless client devices 102 to access the internal network 136. In some scenarios, host devices 104 may also support ad hoc network connections, in which case a wireless access point 142 may not be used.

Functions 140 may operate in concert with function-related hardware 132 and/or I/O devices 130 to implement certain functionality of the host device 104. Depending on the type of host device 104, the function-related hardware 132 may include a wide range of hardware such as scanners, print engines, camera shutters, camera lenses, laser optics, and so on. The network function filter 138 is an executable module that operates to filter functions 140 presented to wireless client devices 102 that have wirelessly accessed the internal network 136. The network function filter 138 presents different sets of functions 140 to wireless clients 102 over network 136 based on the level of security with which the wireless clients 102 wirelessly access the internal network 136. The function filter 138 presents a first set of functions when the wireless client 102 wirelessly accesses the internal network 136 in an "open mode", and a second or third, etc., set of functions when the client wirelessly accesses the network in a "secure mode" using an appropriate security key 144. The first set of functions is typically a limited set of functions, and may in some instances be a single function. The second and subsequent sets of functions are typically more extensive, and include the first set of functions.

In the first example implementation noted above, where the host device 104 is operating in a "single mode at a time" (e.g., open, S1, S2, etc.) as set by the Wi-Fi mode switch 134, wireless clients 102 are able to wirelessly access the internal network 136 based on the mode setting. Thus, the mode setting at switch 134 determines the security level with which wireless clients are permitted to wirelessly access the internal network 136. That is, if the mode switch 134 is set to "open mode" (Open), all wireless clients 102 can wirelessly access the internal network 136 in an open manner without a security key 144. Wireless access to the internal network 136 is not limited for a wireless client 102 when the host device 104 is set to the single "open mode" (Open) by mode switch 134. However, if the mode switch 134 is set to a "secure mode" (S1, S2 . . . Sn), wireless access is limited to those wireless clients 102 able to provide an appropriate security key that corresponds with the current "secure mode" setting, such as a security key 1. Thus, wireless access to the internal network 136 is limited in single mode settings that are "secure modes" (S1, S2 . . . Sn). In either case (i.e., open or secure mode), however, once a wireless client 102 wirelessly accesses the network 136, the network function filter 138 presents a set of functions 140 based on the level of security with which the client accessed the network 136.

In the second example implementation noted above, where the host device 104 is operating in two or more security modes simultaneously, wireless access to the internal network 136 by a wireless client 102 is not limited. In this simultaneous implementation mode, wireless clients can wirelessly access the internal network 136 with or without a security key 144. The filter 138 then determines from a security key 144 if one was provided, or from no security key if one was not provided, which functions 140 of the host device 104 to present to the wireless client 102. Thus, one wireless client 102 wirelessly accessing the internal network 136 in an "open mode" without the use of a security key 144 will be presented with a first set of functions, while simultaneously, another wireless client 102 wirelessly accessing the network 136 in a "secure mode" with the use of a security key 144, will be presented with a second set of functions.

Figure 2:
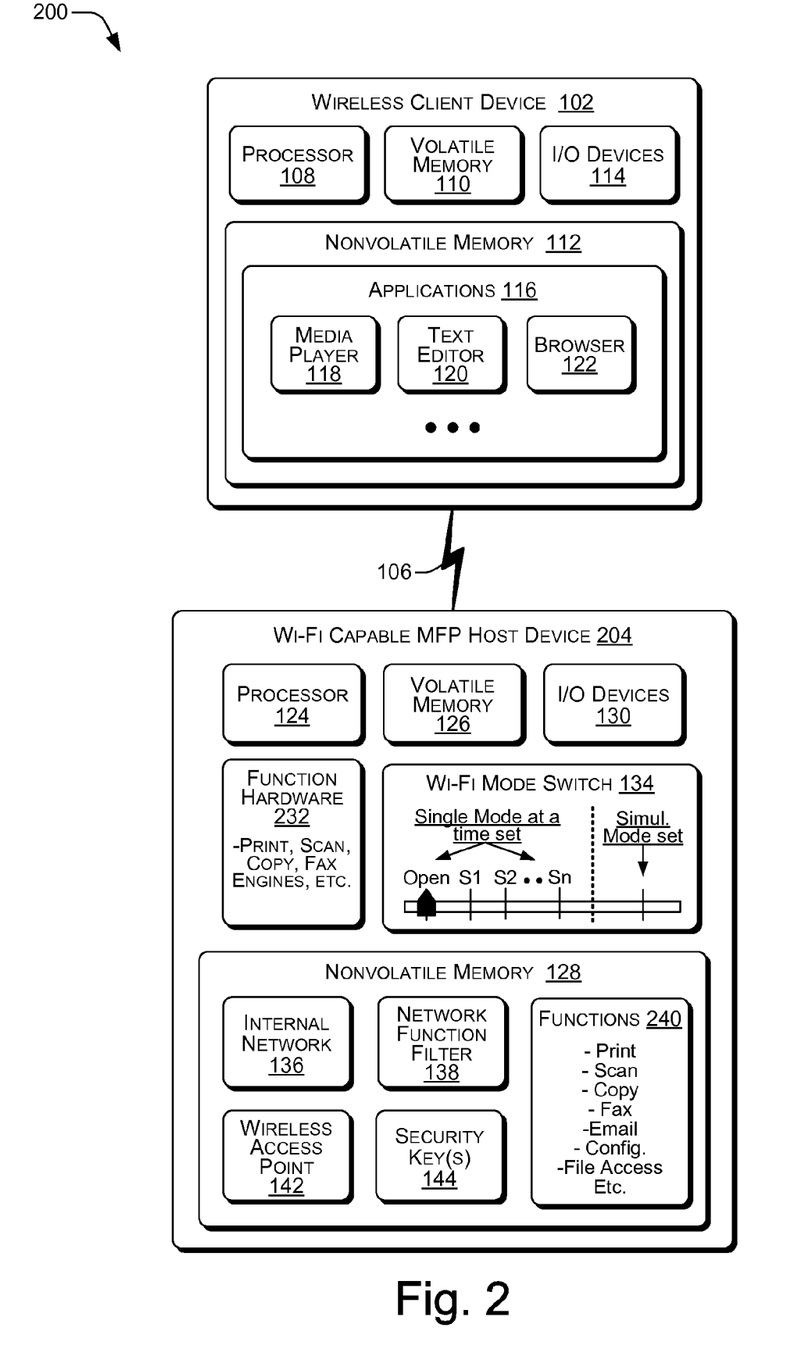
FIG. 2 shows an exemplary environment suitable for wirelessly accessing a specific example of a Wi-Fi capable host device implemented as a multi-function printer (MFP) device, according to an embodiment.

FIG. 2 shows an exemplary environment 200 suitable for wirelessly accessing a specific example of a Wi-Fi capable host device 104 implemented as a multi-function printer (MFP) device, according to an embodiment of the disclosure. The environment 200 includes a wireless client device 102 and a Wi-Fi capable MFP host device 204, coupled through wireless connection 106. As in the environment 100 above in FIG. 1, the general designation herein of wireless client device 102 as a "client" device and Wi-Fi capable MFP host device 204 as a "host" device is due to the typical nature of transactions that take place between the two devices. That is, Wi-Fi capable MFP host device 204 hosts various functions and/or services that are made available to wireless client device 102 through wireless connection 106, which is enabled when wireless client 102 comes within range of host device 204.

The description above regarding the wireless client device 102 and its relation to host device 104 (FIG. 1) applies similarly to the wireless client device 102 and its relation to the Wi-Fi capable MFP host device 204 of FIG. 2, and that description will therefore not be repeated with respect to FIG. 2.

Wi-Fi capable MFP host device 204 represents a Wi-Fi capable version of any typical all-in-one (AIO) device that incorporates multiple functions into one device. MFP devices usually include some combination of printer, scanner, copier, fax and email functionality. While MFP host device 204 includes various functions, it is a focused-purpose type of device as discussed above. The functions available on such MFP devices revolve around the general purpose of centralizing document production, management, and distribution, in a setting such as a home or business office.

The components of Wi-Fi capable MFP host device 204 are generally the same as discussed above with respect to host device 104, except certain specific components related to the particular functions implemented by the MFP host device 204. Thus, the Wi-Fi capable MFP host device 204 includes a processor (CPU) 124, a volatile memory 126, a nonvolatile memory 128, input/output devices 130 such as a keypad and a touch screen, and function-related hardware 232. Function-related hardware 232 in the MFP host device 204 includes mechanisms suitable to facilitate the various printing, scanning, copying, faxing, emailing, configuration, file access and other functions 240 that may be provided by the MFP host device 204. Therefore, function-related hardware 232 may include, for example, a print engine, scan engine, copy engine, fax engine, etc.

The Wi-Fi mode switch 134 of MFP host device 204 works the same as discussed above to enable a user to set the MFP host device 204 to operate in one of several security modes with respect to wirelessly connected client devices 102. Therefore, in a first example implementation the MFP host device 204 operates in a "single mode at a time" setting, as determined by the mode switch 134. The security modes include an "open mode" (Open) and one or more "secure modes" (e.g., S1-Sn). In a second example implementation, the host device 204 operates in a simultaneous mode, which includes operation in two or more security modes simultaneously. Here, the host device 204 may not include a Wi-Fi mode switch 134 at all, or, alternatively, the Wi-Fi mode switch 134 may have a selectable setting for a "simultaneous mode" (Simul. Mode) as shown in FIG. 2.

Nonvolatile memory 128 stores code modules having processor-executable code, that when executed enable various features on the MFP host device 204. As discussed above, code modules include an internal network 136, a network function filter 138, and host device functions 240. The internal network 136 generally enables both wired and wireless connected client devices to access and make use of functions 240 operable on the host device 204. Memory 128 also includes a software-based wireless access point 142 that executes to allow wireless client devices 102 to access the internal network 136. In some scenarios, MFP host device 204 may also support ad hoc network connections, in which case the wireless access point 142 may not be used.

The network function filter 138 is executable to filter MFP device functions 240 presented to wireless client devices 102 over the internal network 136. The network function filter 138 presents different sets of functions 240 to wireless clients 102 over network 136 based on the level of security with which the wireless clients 102 wirelessly access the internal network 136. The function filter 138 presents a first set of functions when the wireless client 102 wirelessly accesses the internal network 136 in an "open mode", and a second or third, etc., set of functions when the client wirelessly accesses the network in a "secure mode" using an appropriate security key 144. The first set of functions is typically a limited set of functions, and may in some instances be a single function. Thus, the first set of functions presented in an "open mode" of access might include just the printing function. The second and subsequent sets of functions are typically more extensive, and include the first set of functions. Therefore, a second set of functions presented in a "secure mode" (e.g., S1 mode) of access might include printing, scanning, copying, faxing and emailing. A third set of functions presented in another "secure mode" (e.g., S2 mode) of access might include printing, scanning, copying, faxing, emailing, device configuration and file access.

When the MFP host device 204 is operating in a "single mode at a time" (e.g., open, S1, S2, etc.) set by the Wi-Fi mode switch 134, wireless clients 102 are able to wirelessly access the internal network 136 based on the mode setting. Thus, the mode setting at switch 134 determines the security level with which wireless clients are permitted to wirelessly access the internal network 136. If the mode switch 134 is set to "open mode" (Open), all wireless clients 102 can wirelessly access the internal network 136 in an open manner without using a security key 144. Wireless access to the internal network 136 is not limited for a wireless client 102 when the host device 204 is set to the single "open mode" (Open) by mode switch 134. However, if the mode switch 134 is set to a "secure mode" (S1, S2 . . . Sn), wireless access is limited to those wireless clients 102 able to provide an appropriate security key 144 that corresponds with the current "secure mode" setting, such as a security key 1. Thus, wireless access to the internal network 136 is limited in single mode settings that are "secure modes" (S1, S2 . . . Sn). In either case (i.e., open or secure mode), however, once a wireless client 102 wirelessly accesses the network 136, the network function filter 138 presents a set of functions 240 based on the level of security with which the client accessed the network 136.

When the MFP host device 204 is operating in two or more security modes simultaneously, wireless access to the internal network 136 by a wireless client 102 is not limited. In this simultaneous implementation mode, wireless clients can wirelessly access the internal network 136 with or without a security key 144. The filter 138 then determines from a security key 144, if one was provided, or from no security key, if one was not provided, which functions 240 of the host device 204 to present to the wireless client 102. Thus, one wireless client 102 wirelessly accessing the internal network 136 in an "open mode" without the use of a security key 144 will be presented with a first set of functions (e.g., a printing function), while simultaneously, another wireless client 102 wirelessly accessing the network 136 in a "secure mode" with the use of a security key 144, will be presented with a second set of functions (e.g., printing, scanning, copying, faxing, emailing functions).

Figure 3:
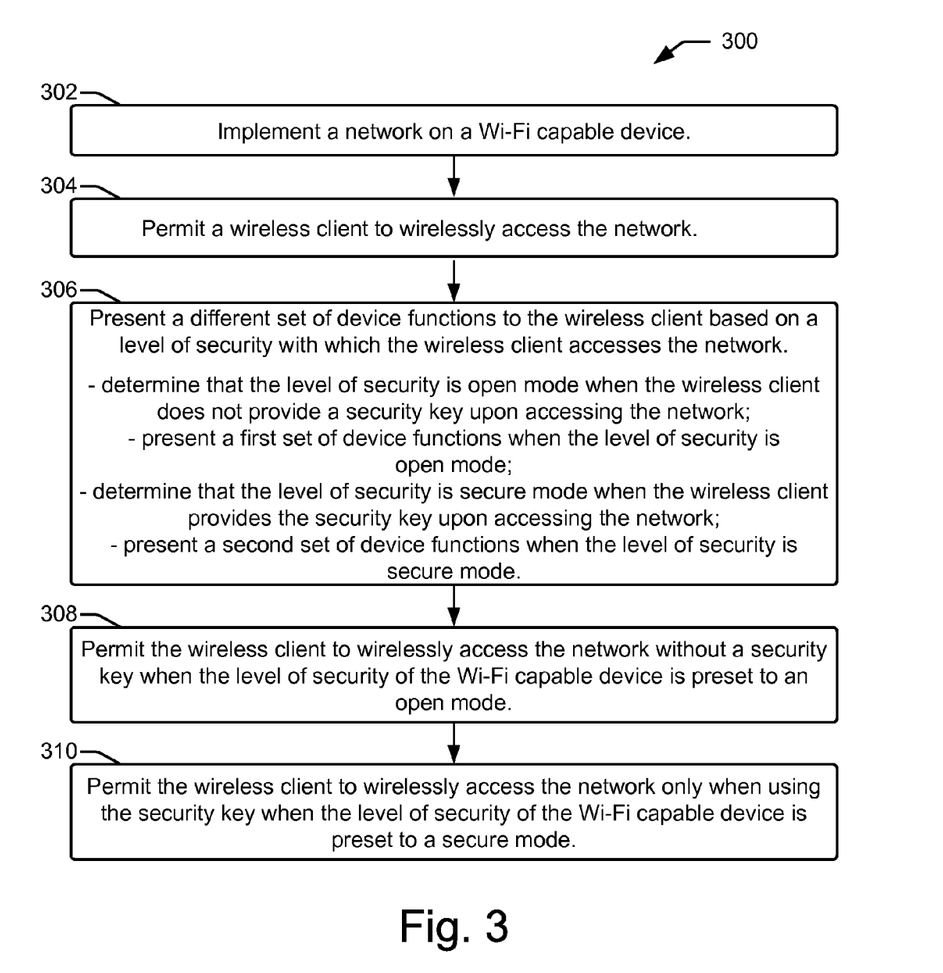
FIGS. 3 and 4 show flowcharts of example methods according to embodiments of the disclosure.
Figure 4:
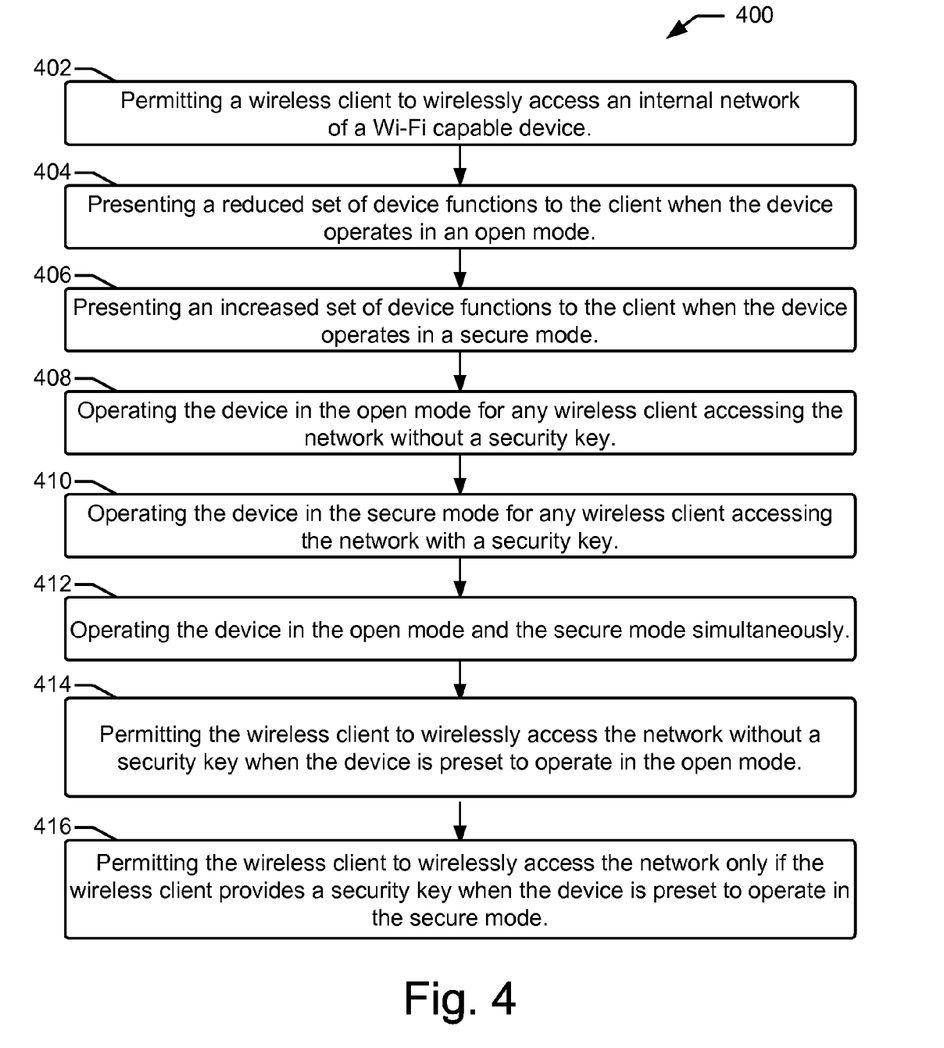

FIGS. 3 and 4 show flowcharts of example methods 300 and 400, according to embodiments of the disclosure. Methods 300 and 400 are related to the wireless access of device functions as discussed herein, and are associated with embodiments discussed above with regard to FIGS. 1 and 2. Details of the steps shown in methods 300 and 400 can be found in the related discussion of such embodiments. The steps of methods 300 and 400 may be embodied as programming instructions stored on a computer/processor-readable medium, such as memory 126 and 128 of FIGS. 1 and 2. In an embodiment, the implementation of the steps of methods 300 and 400 may be achieved by the reading and execution of such programming instructions by a processor, such as processor 124 of FIGS. 1 and 2. While the steps of methods 300 and 400 are illustrated in a particular order, the disclosure is not limited in this regard. Rather, it is contemplated that various steps may occur in different orders than shown, and/or simultaneously with other steps.

Method 300 begins at block 302 where the first step shown is to implement a network on a Wi-Fi capable device. The network is an internal network to the device. At block 304 of method 300, the next step is to permit a wireless client to wirelessly access the network. At block 306, the next step shown is to present a different set of device functions to the wireless client based on a level of security with which the wireless client accesses the network. The step at block 306 can include determining that the level of security is open mode when the wireless client does not provide a security key upon accessing the network, and presenting a first set of device functions when the level of security is open mode. The step at block 306 can also include determining that the level of security is a secure mode when the wireless client provides the security key upon accessing the network, and presenting a second set of device functions when the level of security is a secure mode.

The method 300 continues at block 308 where the next step illustrated is to permit the wireless client to wirelessly access the network without a security key when the level of security of the Wi-Fi capable device is preset to an open mode. And the method 300 ends at block 310 where the last step shown is to permit the wireless client to wirelessly access the network only when using the security key when the level of security of the Wi-Fi capable device is preset to a secure mode.

Method 400 begins at block 402 with the step of permitting a wireless client to wirelessly access an internal network of a Wi-Fi capable device. At block 404, the method continues with presenting a reduced set of device functions to the client when the device operates in an open mode. At block 406, the next step shown in method 400 is presenting an increased set of device functions to the client when the device operates in a secure mode. As shown at block 408, the next step of method 400 is operating the device in the open mode for any wireless client accessing the network without a security key. The next step shown at block 410 is operating the device in the secure mode for any wireless client accessing the network with a security key.

At block 412, the method 400 continues with operating the device in the open mode and the secure mode simultaneously. At block 414, the next step shown is permitting the wireless client to wirelessly access the network without a security key when the device is preset to operate in the open mode. The method ends at block 416 with the step of permitting the wireless client to wirelessly access the network only if the wireless client provides a security key when the device is preset to operate in the secure mode.

What is claimed is:

1. A non-transitory processor-readable medium storing code representing instructions that when executed by a processor cause the processor to:
   implement a network on a Wi-Fi capable device;
   permit a plurality of wireless clients to wirelessly access the network;

operate multiple levels of security modes simultaneously, wherein the multiple levels of security modes include an open mode and a secure mode; and present a different set of device functions to the plurality of wireless clients based on a level of security with which the plurality of wireless clients access the network, including:

present a first set of device functions to a first wireless client among the plurality of wireless clients when the Wi-Fi capable device operates in the open mode; and present a second set of device functions to a second wireless client among the plurality of wireless clients when the Wi-Fi capable device operates in the secure mode.

2. The processor-readable medium of claim 1, wherein the instructions further cause the processor to:

determine that the level of security is open mode when the first wireless client does not provide a security key upon accessing the network; and determine that the level of security is secure mode when the second wireless client provides the security key upon accessing the network.

3. The processor-readable medium of claim 1, wherein the level of security of the Wi-Fi capable device is preset to the open mode, and permitting the first wireless client to wirelessly access the network comprises permitting the first wireless client to wirelessly access the network without a security key.

4. The processor-readable medium of claim 1, wherein the level of security of the Wi-Fi capable device is preset to the secure mode, and permitting the second wireless client to wirelessly access the network comprises permitting the second wireless client to wirelessly access the network only when using the security key.

5. A method comprising:

permitting a plurality of wireless clients to wirelessly access an internal network of a Wi-Fi capable device;

operating multiple levels of security modes simultaneously, wherein the multiple levels of security modes include an open mode and a secure mode; and presenting a different set of device functions to the plurality of wireless clients based on a level of security with which the plurality of wireless clients access the internal network, including;

presenting a first set of device functions to a first wireless client among the plurality of wireless clients when the Wi-Fi capable device operates in the open mode; and presenting a second set of device functions to a second wireless client among the plurality of wireless clients when the Wi-Fi capable device operates in the secure mode.

6. A method as in claim 5, the method further comprising:

operating the Wi-Fi capable device in the open mode for the first wireless client accessing the internal network without a security key; and operating the Wi-Fi capable device in the secure mode for the second wireless client accessing the internal network with a security key.

7. A method as in claim 5, wherein the Wi-Fi capable device is preset to operate in the open mode, and permitting the first wireless client to wirelessly access the internal network comprises permitting the first wireless client to wirelessly access the internal network without a security key.

8. A method as in claim 5, wherein the Wi-Fi capable device is preset to operate in the secure mode, and permitting the second wireless client to wirelessly access the internal network comprises permitting the second wireless client to wirelessly access the internal network only if the second wireless client provides a security key.

9. A Wi-Fi capable device comprising:

a memory having computer readable instructions stored thereon; and a processor coupled to the memory wherein the processor executes the instructions to:

execute a plurality of device functions;

access an internal network wirelessly accessible by using a plurality of wireless clients;

operate multiple security modes simultaneously, wherein the multiple security modes include an open mode and a secure mode; and execute a network function filter to present filtered sets of the device functions to the plurality of wireless clients over the internal network based on a security mode of the Wi-Fi capable device, including:

present a first set of device functions to a first wireless client among the plurality of wireless clients when the security mode of the Wi-Fi capable device is the open mode;

present a second set of device functions to a second wireless client among the plurality of wireless clients when the security mode of the Wi-Fi capable device is the secure mode.

10. The Wi-Fi capable device as in claim 9, further comprising a security mode switch to set the Wi-Fi capable device to the open mode or to the secure mode.

11. The Wi-Fi capable device as in claim 10, wherein the secure mode comprises a plurality of secure modes.

12. The Wi-Fi capable device as in claim 9, further comprising a wireless access point to enable the wireless clients to wirelessly access the internal network.

13. The Wi-Fi capable device as in claim 9, wherein the first set of device functions comprises a limited set of device functions, and the second set of device functions comprises an expanded set of device functions that includes the first set of device functions.

* * * * *

UNITED STATES PATENT AND TRADEMARK OFFICE
CERTIFICATE OF CORRECTION

PATENT NO. : 8,739,248 B2
APPLICATION NO. : 13/405788
DATED : May 27, 2014
INVENTOR(S) : Phillip A. Mccoog et al.

Page 1 of 1

It is certified that error appears in the above-identified patent and that said Letters Patent is hereby corrected as shown below:

In the Claims

In column 10, line 24, in Claim 9, after "wirelessly" delete "accessible by".

Signed and Sealed this
Twenty-ninth Day of September, 2015

Michelle K. Lee
*Director of the United States Patent and Trademark Office*